US006692615B1

(12) United States Patent  
Cathey

(10) Patent No.: US 6,692,615 B1
(45) Date of Patent: Feb. 17, 2004

(54) METHOD OF MAKING A SLURRY

(76) Inventor: Timothy D. Cathey, 401 W. Aycock St., Raleigh, NC (US) 27608

( * ) Notice: Subject to any disclaimer, the term of this patent is extended or adjusted under 35 U.S.C. 154(b) by 15 days.

(21) Appl. No.: 10/123,340

(22) Filed: Apr. 16, 2002

Related U.S. Application Data

(60) Division of application No. 09/814,606, filed on Mar. 22, 2001, now Pat. No. 6,399,185, which is a continuation-in-part of application No. 09/182,488, filed on Oct. 30, 1998, now abandoned, and a continuation-in-part of application No. 09/498,987, filed on Feb. 7, 2000, now Pat. No. 6,386,144.

(60) Provisional application No. 60/191,156, filed on Mar. 22, 2000.

(51) Int. Cl.$^7$ .................. D21H 17/66; D21H 11/12; D21H 11/14

(52) U.S. Cl. .............. 162/148; 162/147; 162/149; 162/95; 162/181.3; 162/158; 106/461; 106/680; 106/772

(58) Field of Search .............. 162/147–149, 162/158, 95, 181.2, 181.3, 4; 106/680, 461, 715, 722, 735, 772, 786, 731, 732, 619, 627

(56) References Cited

U.S. PATENT DOCUMENTS

| | | | | |
|---|---|---|---|---|
| 2,120,268 A | * | 6/1938 | Schuh ................. | 162/181.6 |
| 2,156,308 A | * | 5/1939 | Schuh ................. | 162/154 |
| 3,533,906 A | * | 10/1970 | Reiniger ............. | 162/13 |
| 3,951,735 A | * | 4/1976 | Kondo et al. ....... | 162/133 |
| 4,419,256 A | * | 12/1983 | Loomis ............... | 252/62 |
| 4,470,877 A | * | 9/1984 | Johnstone et al. .. | 162/124 |
| 4,494,482 A | * | 1/1985 | Arnold ................ | 119/173 |
| 4,570,573 A | * | 2/1986 | Lohman ............... | 119/172 |
| 4,622,920 A | * | 11/1986 | Goss ................... | 119/173 |
| 4,676,196 A | * | 6/1987 | Lojek et al. ........ | 119/172 |
| 4,734,163 A | * | 3/1988 | Eberhardt et al. .. | 162/181.3 |
| 4,801,355 A | * | 1/1989 | Johnstone et al. .. | 162/181.3 |
| 4,853,085 A | * | 8/1989 | Johnstone et al. .. | 162/128 |
| 4,911,788 A | * | 3/1990 | Pittman et al. ..... | 162/145 |
| 5,094,190 A | * | 3/1992 | Ratcliff et al. ..... | 119/173 |
| 5,096,748 A | * | 3/1992 | Balassa ............... | 427/384 |
| 5,171,366 A | * | 12/1992 | Richards et al. .... | 106/772 |
| 5,176,108 A | * | 1/1993 | Jenkins et al. ...... | 119/173 |
| 5,188,064 A | * | 2/1993 | House .................. | 119/172 |
| 5,207,837 A | * | 5/1993 | Honeycutt ........... | 134/42 |
| 5,215,041 A | * | 6/1993 | Krahenbuhl .......... | 119/172 |
| 5,230,305 A | * | 7/1993 | House .................. | 119/171 |
| 5,303,720 A | * | 4/1994 | Banerjee et al. .... | 131/194 |
| 5,520,779 A | * | 5/1996 | Bold .................... | 162/181.3 |
| 5,632,848 A | * | 5/1997 | Richards et al. .... | 156/346 |
| 5,723,226 A | * | 3/1998 | Francis et al. ...... | 428/688 |
| 5,945,208 A | * | 8/1999 | Richards et al. .... | 428/294.7 |
| 6,029,603 A | * | 2/2000 | Evans et al. ........ | 119/171 |
| 6,030,565 A | * | 2/2000 | Golan ................. | 264/117 |
| 6,386,144 B1 | * | 5/2002 | Cathey ................ | 119/172 |
| 6,399,185 B1 | * | 6/2002 | Cathey ................ | 428/221 |
| 6,406,535 B1 | * | 6/2002 | Shintome ............ | 106/705 |

* cited by examiner

Primary Examiner—Jose A. Fortuna
(74) Attorney, Agent, or Firm—Mills Law Firm PLLC

(57) ABSTRACT

An organic substrate is manufactured from recycled waste paper, cotton fiber and cotton gin waste, and gypsum. The recycled waste products are combined to form a slurry mixture for processing by conventional paper making machinery into a substrate that may be used in sheet form or comminuted pieces.

6 Claims, 2 Drawing Sheets

METHOD OF MAKING A SLURRY

CROSS REFERENCE TO RELATED APPLICATIONS

This application is a divisional application of U.S. patent application Ser. No. 09/814,606 filed on Mar. 22, 2001 now U.S. Pat. No. 6,399,185 B1, which is a continuation-in-part application of U.S. patent application Ser. No. 09/182,488 filed on Oct. 30, 1998, now abandoned in the name of Timothy D. Cathey and entitled "Method of Manufacturing Absorbent Material for Conversion to Fertilizer", a continuation-in-part application of U.S. patent application Ser. No. 09/498,987 filed on Feb. 7, 2000, now U.S. Pat. No. 6,386,144 B1, in the name of Timothy D. Cathey and entitled "Method of Manufacturing Absorbent Material for Conversion to Fertilizer", and claims the benefit under 35 USC 121 of United States Provisional Application No. 60/191,156 filed on Mar. 22, 2000 in the name of Timothy D. Cathey and entitled "Method of Manufacturing Absorbent Material for Conversion to Fertilizer".

FIELD OF INVENTION

The present invention relates to a method of manufacturing absorbent materials, and, more particularly, to a method of converting such materials to a substrate for use as an organic mulch and seed germination carrier.

BACKGROUND OF THE INVENTION

Methods for the manufacture of animal bedding products from waste paper pulp and other fibrous materials are well known to those skilled in the art. For example, U.S. Pat. No. 2,708,418 discloses an animal bedding product for use in the poultry industry that is manufactured from waste paper pulp and other chemical additives. Animal bedding material formed from such a process has high absorptivity and drying characteristics making it desirable for use as a bedding material in the poultry industry.

U.S. Pat. No. 3,828,731 to White discloses a litter or bedding material for animals and a method of making the same. The litter is biodegradable in water and soil environments and is flushable through normal household sanitary disposal systems. The litter consists primarily of high purity alphacellulose paper stock fibers in the form of pieces cut from a sheet of such material and into which has been incorporated microbial inhibitors.

U.S. Pat. No. 2,708,418 to Sugarman, et al. discloses an animal bedding material manufactured from paper pulp adapted to absorb liquids resulting from animal excrement. In this invention a pulp slurry is formed into pulp-board sheets, which are then cut and dried to the desired size into which bacterial growth inhibitors are added.

U.S. Pat. No. 2,014,900 to Lapp discloses a process of manufacturing litter suitable for poultry and livestock through the processing of cottonseed hulls, a waste product of the cotton industry. The cotton seed hulls are treated with various chemical solutions containing quinine sulfate, pine oil, turpentine, and formaldehyde to produce the litter.

U.S. Pat. No. 1,967,333 to Smith discloses an improved bedding material for poultry and animals using so-called bagasse i.e. the crushed and extracted waste from sugar-cane production, as the raw fibrous material.

U.S. Pat. No. 5,100,600 to Keller, et al. discloses a method of making an absorbent paper-containing granulate which includes mechanically comminuting paper into irregular fragments, crumpling and interlacing the fragments so as to create internal spaces therein, rough pressing the interlaced and crumpled fragments into pre-pressed tubular formations, and converting the formations into granules or pellets. The granulate material can be used as litter or as an oil binding material.

U.S. Pat. No. 5,728,192 to Andrew, Jr., discloses a method of processing fibrous waste materials, such as textile waste, in which the waste materials which are not particulate are formed into particles, and the particles are thoroughly mixed to form a waste mixture. The waste mixture has an increased temperature which allows the mixture to be used as a heat source as well as a plant growth medium.

U.S. Pat. No. 4,203,388 to Cortigene, et al. discloses an animal litter prepared by de-watering the rejects of a secondary paper fiber plant, incorporating a deodorant therein, for example, sodium bicarbonate, pelletizing, and drying.

U.S. Pat. No. 3,980,050 to Neubauer discloses a poultry litter which is absorbent but capable of giving up absorbed liquids to the atmosphere under conditions of usual use in poultry houses, such that the litter tends to be maintained dry to the touch and uncompacted. The litter is itself a body of moisture-containing crumbs formed of low density bark and cellulosic fibrous material adhered to and carried by the bark.

U.S. Pat. No. 4,821,677 to Harrison discloses a method of making animal litter having improved absorbent and deodorizing qualities which utilize ground peanut hulls, peanut shells, and finally ground natural mineral in a dry mixture. The mineral constituent provides ionic bonding for the nitrogen ions in liquid animal waste to reduce the odor of animal litter exposed thereto.

U.S. Pat. No. 3,916,831 Fisher is considered of general interest in that it discloses a system for animal excrement control which comprises the use of popcorn as a means of absorbing and/or absorbing excrement.

Finally, U.S. Pat. No. 4,471,717 to Lander is considered of general interest in that it discloses a hydrophobic substantially non-absorbent, substantially non-water wettable granular material suitable for use as a bedding for animals or for use as litter material in a waste receptacle for animals.

Notwithstanding the foregoing approaches, in the poultry field in particular the use of pine shavings has been the bedding of choice. Such shavings had heretofore been widely available and relatively inexpensive. Additionally, the shavings were highly absorbent of waste with good evaporation characteristics permitting usage for extended periods without replacement. Lately, however, newly emerging wood products have reduced the availability and increased the cost of such shavings. Shavings mixed wit (less effective) sawdust is used any many areas. Moreover, the geographic distribution of poultry operations has spread to areas where the shavings are not readily available. After exhaustion of efficacy, the spent shavings have no further application and must be disposed in accordance with environmental regulations, an added cost for the poultry grower.

Accordingly, a need exists for improved bedding materials from readily available, inexpensive sources providing efficacy and longevity in use, and minimizing or avoiding expensive disposal costs.

SUMMARY OF THE INVENTION

After much study and research into the prior art, the present invention has been developed to provide an absorbent bedding material manufactured from a combination of recycled waste paper, waste cotton material, and gypsum using a water laid process and paper manufacturing equipment. The resulting fibrous, highly absorptive material provides a useful livestock bedding material having fire resistant characteristics due to the gypsum content. The material can also be utilized in the manufacturer of absorbent cloth wipes and cage liners for research animals and pets.

After the absorbent material has been utilized, for example, as poultry bedding wherein it becomes saturated with nutrient-laden excrement, it is retrieved and undergoes further processing to become an slow release constituent fertilizer and soil amendment.

The absorbent bedding material of the present invention also has alternative uses such as absorbing and collecting liquid chemical spills and the remediation of such chemical spills due to its biodegradable composition.

A further aspect of the invention is the utilization of the substrate, in sheet or comminuted form, as a barrier against weed growth in agricultural and horticultural uses. The barrier effectively prevents invasive weed growth in crops grown in covered and/or fumigated plots, thereby substantially eliminating or reducing the need for chemical fumigants, such a methyl bromide, and replacing plastic sheeting with a biodegradable tillable material. In another aspect of the invention the substrate in sheet form provides a growth medium for the hydroponic germination of seeds, whereby the seeds adhered to the substrate with organic adhesives effectively germinate and establish roots under conventional conditions. For lawn and other coverage grasses, the substrate with established root systems may be harvested without attendant soil for transplanting at site. On-site, the substrate functions as a weed barrier and eventually biodegrades after the planting is established.

In view of the above, it is an object of the present invention to produce a highly absorptive material made from a combination of recycled paper, cotton waste products, and gypsum for use as livestock bedding.

Another object of the present invention is to provide such an absorptive material by combining the constituent materials in a pulp slurry and forming the slurry into sheets using a water laid process and a variety of paper manufacturing equipment.

Another object of the present invention is to provide a highly absorptive material which after being deployed as animal bedding and becoming saturated with nutrient rich excrement, can be further processed into an organic fertilizer and soil amendment.

Another object of the present invention is to provide a highly absorptive animal bedding material having alternative uses such as for collection of liquid chemical spills and for remediation of such spills by biodegradation.

Another object of the present invention is to provide a highly absorptive animal bedding material having superior performance characteristics in comparison with comparable products on the market.

Yet another object is to provide a weed barrier material formed of organic? materials that is tillable and biodegradable.

A further object is to provide a soil free carrier substrate for germinating seed and establishing root systems thereon.

BRIEF DESCRIPTION OF DRAWINGS

The above and other objects and advantages of the present invention will become apparent upon reading the accompanying detailed description taken in conjunction with the following drawings in which.

DETAILED DESCRIPTION OF THE PREFERRED EMBODIMENTS

Figure 1:
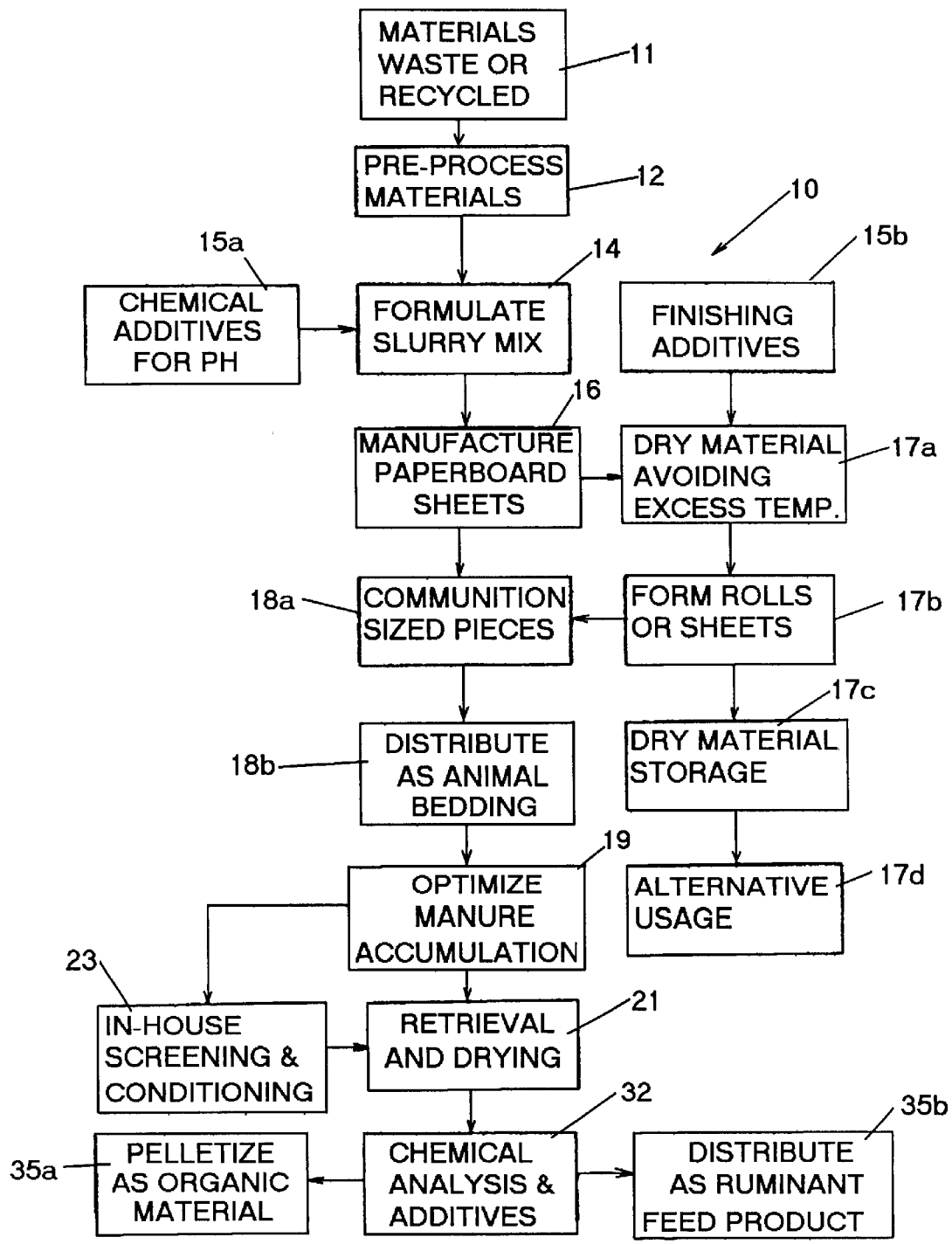
FIG. 1 is a block diagram illustrating the overall method of the present invention.

Referring to the drawings, there is shown therein a block diagram outlining the steps in the method of the present invention illustrated in FIG. 1 and indicated generally at 10 for the manufacture from waste paper, cotton and gypsum products and absorbent substrate collected at block 11.

As an initial step in accordance with the present method, sufficient quantities of a wood pulp products such as old newsprint, mixed waste paper, boxboard, corrugated board and similar materials are collected at block 11 and undergo pre-processing at block 12 to eliminate extraneous material, such as glue, hardware, excess coatings, clear windows and other foreign contaminants. A slurry mixture is formed at block 14 using the formulations described below, additives as required or desirable, are added at blocks 15a and 15b. The slurry is converted into sheets on papermaking machine at block 16, dried at block 17a to a desired moisture content, and formed into rolls or sheets at block 17b. Such processed material may be inventoried at block 17c for alternative usage at block 17d, such alternative uses discussed in greater detail below. For poultry bedding and other similar applications, the dry material in comminuted into appropriate shapes at block 18a and distributed as bedding at block 18b. The material absorbs waste accumulations in use at block 19, and is subsequently retrieved and dried at block 21. From time to time during use the bedding may undergo screening and conditioning at block 23. Subsequent to collection, the material is analyzed and additives incorporated at block 32 for conversion to fertilizer at block 35a or ruminant feed product at block 35b.

Of course, such pre-processing operations may be carried out by the manufacturing activity or such paper waste materials may be purchased in ready-to-use bulk particles or in pelletized form.

Similarly, the cotton mill waste, gin trash, gin motes, or post consumed cotton products must be cleaned, refined and sized to a sufficient extent to remove unwanted seed hulls and plant remnants to provide the cotton fiber.

Thereafter, the resultant cotton fiber is cut to a predetermined fiber length in the range of 0.2 to 10 mm to provide optimum characteristics in the finished product.

Gypsum can be obtained from recycled wallboard or in by-product form such as calcite gypsum from the manufacturer of other chemicals and must be screened and dressed to the proper particulate size. The hydrated gypsum adds flame-retardant qualities and the ability to assist in bonding nitrogen ions to reduce volatilization and loss when the finished material is being used to absorb animal excrement.

Once the above constituent materials have been obtained in sufficient quantities and pre-processed, the formulation of a slurry mixture is conducted at block 14. As described below, highly absorbent and quick drying substrates were formed using mixed waste paper in the range of 10% to 90%, cotton fiber in the range of 10% to 90%, and hydrated gypsum in the range of 5% to 50% of the dry cotton weight. In the preferred embodiment, it has been determined that a formulation of 25% to 75% mixed waste paper, 25% to 75% processed cotton waste fiber, and 10% to 45% solution of hydrated gypsum based on the moisture free cotton fiber weight provides optimum results. The combined slurry mixture is diluted to approximately 1% to 10% total solids weight in the slurry or whatever solids weight is dictated by the paper manufacturing equipment.

Of course, the constituent quantities of the above formulation can vary over a wide range of percentages depending upon the density and drying characteristics desired in the finished material. Similarly, the cotton fiber content may be varied based upon the fiber length, the degree to which the fiber is refined or hydrapulped during pre-processing, and the absorptivity for moisture required in the finished product. The specific type of paper manufacturing equipment used to transform the slurry mixture into the finished paper sheets of the present method will dictate the slurry formulation.

Highly absorbent and quick drying sheet have been effectively processed into sheet form on conventional paper making equipment in accordance with the following examples.

EXAMPLE 1

Cotton mill waste was obtained in bale form and air-dried to yields 500 pounds dry weight. Approximately 2000 gallons of cold water were added to the mill was a processed in a Tornado Pulper at a consistency of around 3 to 3.5%. After pumping into a holding tank, the slurry was uniform in appearance, with a dark gray-brown color. The slurry was transferred to a blending tank and combined with 200 pounds of gypsum plaster hydrated in a conventional hydrapulper with hot water for about 20 minutes. Thereafter, 30 bags of shredded newsprint in the amount of about 1500 dry pounds were added. The blend was transferred to a hydrapulper and diluted with warm water, 120° to 130° F., to provide a 3% to 3.5% solids slurry. The slurry was processed to make a sheet thickness of 0.014 to 0.027 inch and dried to a moisture content of 6 to 10%. The resultant sheet was chopped into small pieces. When immersed in cold tap water, the pieces became saturated in 5 to 6 seconds indication a high rate of absorbency.

Further formulations in accordance with the above were processed in accordance with the following examples.

EXAMPLE 2

A slurry was formed comprising 85% mixed news print, 15% cotton mill waste refined a 0.3 mm clearance on a separator, 20% hydrated gypsum by weight of cotton mill waster and diluted with water to a 1% solids content was processed on wet process paper making equipment to form a 0.010 to 0.022 inch thick sheet. The sheet was comminuted into pieces and exhibited excellent moisture absorbency and drying characteristics.

EXAMPLE 3

A slurry was formed comprising 75% mixed news print, 25% cotton mill waste refined a 0.65 mm clearance on a separator, 20% hydrated gypsum by weight of cotton mill waster and diluted with water to a 1% solids content was processed on wet process paper making equipment to form a 0.025 to 0.040 inch thick sheet. The sheet was comminuted into pieces and exhibited moisture absorbency and drying characteristics comparable to Example 2.

EXAMPLE 4

A slurry was formed comprising 75% mixed news print, 25% cotton mill waste without refining, 40% hydrated gypsum by weight of cotton mill waster and diluted with water to a 1% solids content was processed on wet process paper making equipment to form a thick sheet. The sheet was comminuted into pieces and exhibited excellent moisture absorbency and drying characteristics.

At this dilution stage it is often desirable or advantageous to admix to the slurry one or more chemical additives at block 15 which further enhance or promote the absorbency of the bedding material. In addition to or instead of absorbency enhancing additives, the present method can involve the admixture of natural disinfectants or a similar agent for the purpose of preventing mold formation and inhibiting the growth of disease-producing microorganisms. In addition, various natural deodorants, flavoring agents, pH-adjusters, and dyestuffs may be added to provide a specific characteristic.

The addition of various chemical additives to the slurry mixture is dependent upon the end use of the present material. If inhibition of bacterial growth is desired, addition of a potassium compound such as pH adjusters is desirable at a rate to produce a finished material with a pH of 8–9.

If the present bedding material is to be used with a pro-biotic and bacterial growth on the material is desired, addition of potassium hydroxide is limited to produce a pH of 6.5–7.5 on average.

Other hydroxides of calcium, magnesium, and potassium can be added to produce the desired pH.

In addition, other reactive compounds of the active metals can be admixed to the slurry to enhance the nitrogen bonding characteristics of the absorbent material. However, care must be taken to insure that the additives and resultant pH ranges do not contribute to skin irritation or other health problems of the livestock bedded on the present materials.

Since such chemical additives are well known to those skilled in the art, further detailed discussion of the same is not deemed necessary.

Figure 2:
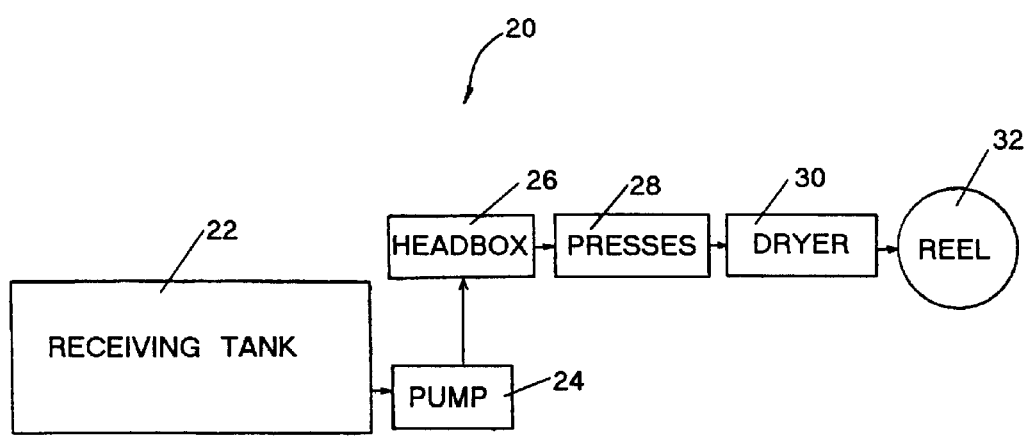
FIG. 2 is a block diagram showing the components of the paper making equipment utilized in the present method.

As previously discussed, the slurry mixture undergoes processing in conventional paper making machinery into paperboard sheets at block 16. Referring to FIG. 2, there is shown therein a block diagram illustrating the basic components and functions of a paper making machine, indicated generally at 20. The machine 20 includes a receiving tank 22 wherein the slurry mixture is contained and agitated by a high-velocity, high volume pump 24 for the minimum time necessary to produce a homogeneous mixture to eliminate "roping" of the fibrous material into elongated strands.

A pump 24 of the type known in the industry as a Moyno progressing cavity pump is suitable for this application. In this type of positive displacement pump, there is no rotating impeller that may become fouled by the circulating cotton fibers in the slurry, which cause the unacceptable roping or stringing effect about a rotating impeller.

Of course, various other types of pumps can be used to circulate the slurry mixture and the Moyno Progressing Cavity Pump is intended to be merely illustrative and not restrictive in any sense.

The pump 24 delivers the slurry mixture to the so-called head box 26 of the paper machine wherein the slurry mixture is formed into sheet material. It will be understood by those skilled in the art that if the thickness of the sheet material to be produced exceeds the capacity of the head box 26 a different paper machine of the type known in the industry as a cylinder machine may be utilized in the present process.

Since such paper making machines are well known to those skilled in the art, further detailed discussion of the same is not deemed necessary.

Thereafter, the sheets undergo de-watering and are conveyed to a press 28 for finishing to the desired thickness and subsequently to one or more twin-roll presses (not shown) in which the moisture content of the sheet material is reduced further by mechanical pressing.

Next, the sheet material passes across heated drying rollers 30 which cause the bulk of the moisture remaining in the sheet material to evaporate. At this stage various finishing additions may be applied to the sheet material to adjust the pH and to provide other specific characteristics described hereinabove.

Thereafter, the dried sheet material obtained using the above process is ready to be packed for storage or for shipment to distributors, retailers or individual users of the product, as at block 17 in FIG. 1.

The sheet material produced in accordance with the present method exhibits a high specific absorbency two to eight times its weight in water and quick drying, as well as exceptional fire-resistant characteristics due to the gypsum content. In addition, the finished material has an equally desirable ability to retain its shape in sheet form and not to break down into a substance of pulpy consistency, which facilitates shipping and handling of the material. The density of the rolled material at finished thickness is approximatel 8–27 lbs. per cubic foot. This density provides a sheet material in a form that packs efficiently on a truck and, thus, the load weight capacity of the vehicle is the only limiting factor in shipping.

If the absorbent sheet material is to be utilized as poultry bedding, the finished sheets are comminuted as at 18 into flat and random shaped pieces of a predetermined size having a maximum single dimension of 0.8 inches (20 mm) and inclusive of 0.184 to 0.5 square inches single side of surface area.

In the preferred embodiment generally 3-dimensional rectangular, triangular polygonal shapes or a mixture thereof having an angular fold, creates an absorbent wick with maximum loft depth using a minimum of material. In this form, the absorption rate and drying rate of the material make it an efficient poultry bedding even in reduced quantities.

The durability of the present material allows longer life of the bedding before it begins to decompose. The recommended application rate requires about 0.5 to 0.85 lbs. per square foot, which is about one-third the rate of conventional pine shavings, providing an obvious cost advantage.

More particularly, the standard application rate for conventional pine shavings as poultry bedding varies from 4 to 8 inches of shavings on the floor of the poultry house. The bedding material provided by the present method weighs only one third that of pine shavings. Testing of the present bedding material has indicated significant improvements in feed to weight conversion in poultry at a bedding depth of two inches, which is 0.58 pounds per square foot versus two inches of pine shavings which weigh 1.82 pounds per foot or 3.14 times the weight of the present bedding material.

The high absorbency of the present bedding material in combination with its biodegradable components and durability, permits saturation of the present material as at 19 with nutrient-rich compounds to provide an organic fertilizer and soil amendment.

After raising multiple flocks over the durable absorbent bedding material of the present invention, it can be cleaned of manure that adheres to the surface thereof by a screening device as at 23 which separates the accumulated manure and redeposits the bedding for further use.

After the optimum number of poultry flocks have passed over the present bedding material and it starts to degrade, it may be retrieved and dried as at 21 and further processed to produce an organic constituent fertilizer as at 35.

This is accomplished by the use of a high capacity vacuum device (not shown) which can efficiently remove the saturated bedding material for delivery to a microwave dryer or mineral dryer (not shown). The drying process may be carried out at the site of the poultry farm or, in the alternative, the saturated bedding material may be transported to a remote processing site.

At the completion of the drying process, the saturated material is subject to chemical analysis as at 32 and other chemical amendments may be added to balance the analysis of the organic fertilizer 35. Thereafter, the converted fertilizer is pelletized, bagged or bulk packaged for shipping and distribution to contract yard services, retailers or individual users.

Further, the resultant nutrient rich material can also be utilized as a ruminant feed or dietary supplement for animals such as cows after chemical analysis and processing to eradicate harmful microorganisms.

From the above it can be seen that the method of the present invention provides an absorbent animal litter material, which is comprised of recycled waste products including mixed waste paper, cotton waste, and gypsum. The constituent materials are formed into sheets using paper-making equipment and converted into sized particles which serve as a bedding material in livestock operations such as poultry farming.

After becoming saturated with nutrient-rich compounds from livestock excrement, the absorbent bedding material can be further processed into an organic fertilizer and distributed to retailers or individual users.

Further, the present invention provides a versatile bedding material, which may be utilized in sheet form for caged research animals or pets and in small particle sizes for use as litter for a variety of livestock animals.

In addition, the absorbent bedding material of the present invention also has alternative uses such as absorbing and collecting liquid chemical spills and the remediation of such chemical spills due to its biodegradable composition. It also functions as a weed barrier around planting beds and gardens.

Finally, the saturated animal bedding material may also be used to feed ruminant animals such as cows by careful attention to the ingredients and chemical additives used during its manufacture.

The material as described as may also be utilized for preventing and retarding the growth of unwanted vegetation with respect to select biological species. For purposes of illustration, the material may be used in sheet or comminuted form as a barrier, cover, mulch or the like against the growth of weeds and other undesired plant species in conjunction with horticultural applications including ornamental or economic vegetation, by way of example root vegetables grown in raised beds or around planting beds and gardens.

Therein the non-wood fiber can come from various agricultural residue such as flax, knaf, corn stalk, straw, grasses and weeds, and the like. The wood fiber and cellulosic material may include used news print, mixed office waste, box board, chip board, and fines from paper making and other residue from the paper making process. The filler materials may comprise gypsum alone or in combination with calcium carbonate, lime, non-reactive mineral fillers, nutrient releasing materials, and the residues from papermaking or paper recycling. Such applications may also benefit from the addition of wet strength additives and be appropriately increased in thickness for environmental resistance. Suitable wet strength additives include alum, rosin, and Kymene, alone or in combination. The substrate thickness is appropriate for resisting the local environmental conditions.

As barriers, the substrate has been demonstrated to inhibit weed growth, and at the end of the growing season, unlike conventional plastic barriers, may be tilled into the soil. Weed control is the single most important problem facing vegetable growers, particularly in the south Atlantic area of the United States. At present, a prevalent method of control uses a barrier sheet of plastic material and injection of methyl bromide as a herbicidal fumigant therebelow. However, organic growers and small-scale farmers are hesitant to use plastic mulch inasmuch as it is a nonsustainable practice, non-biodegradable and difficult to remove at the end of the growing season. Moreover, due to environmental concerns, the use of methyl bromide is being phased out.

As a vegetation substrate, the present invention obviates and/or substantially reduces the need for methyl bromide fumigation. In one type of agricultural application, the crop is planted by overlying the area with a barrier of the present invention, piercing the barrier and implanting the target seed or seedling.

EXAMPLE 5

A small-scale experiment was conducted in side-by-side trial with paper mulch in sheet form and plastic mulch, 1.2 mil co-extruded white on black polyethylene, and bareground control. Basic tested formulations included 20% cotton, 80% old newsprint or used corrugated container, with 20% gypsum as filler. Secondary formulations may include rosin and alum for improved wet strength organic material, as well as Kymene, a brand of wet and dry strength additive used in paper processing. The additives may be in the range of about 0.5 to 4% of total fiber. Plots were arranged in a randomized block design with four replications of each treatment. Each plot was 25 feet long with a raised bed. Beds were established with a 30 inch planting area and a bed height of 10 inches. At time of bedding, the planting area was free of emerged weeds. Weed counts were taken at 12 and 24 days after bedding. Excellent weed control resulted from application of the paper mulch of the present invention. At day 24, nutsedge counts, per meter square were: 38 for bare-ground control plots; 36 for plastic sheet control plots; and 0 for the paper mulch. Complete control was achieved for Carolina geranium, large crabgrass, nigthshade, thoroughwort, ragweed, commelina, and portulaca. Based on the foregoing results, the paper mulch was deemed to demonstrate excellent potential for weed control. The nutsedge control was considered particularly important as it is considered to be the most important weed problem for growers in the planting area, and the most limiting factor for satisfactory organic production. The nutsedge control achieved with the paper mulch was excellent and no nutsedge emerged through the paper during the testing period. Nutsedge growing beneath the paper mulch was chlorotic and stunted, posing no competitive threat to any of the primary vegetable crops, including melons, tomatoes, strawberries, peppers, potatoes and lettuce. After removal of the paper mulch, residual control of nutsedge was maintained for over 30 days.

The barrier may also be covered with adhered seed on the top surface, for horticultural applications including lawn grass and economic vegetation. Under suitable growing conditions, the seeds having been found to readily germinate with the root system growing through the barrier. Germination is achieved over soil or and hydroponically. In these economic applications as well as ornamental deployment, the barriers are gradually biodegradable. The resultant barrier reduces the need for pre-emergence and post-emergence herbicides, retains soil moisture, and reduces competition of unwanted plants for moisture, nutrient, and sunlight. Further, the material stabilizes soils, and reduces water erosion, soil transportation, and wind erosion. The carrier may also beneficially incorporate additives on the bottom surface for promoting healthy growth including fungicides, growth stimulants and initial fertilizer amount.

EXAMPLE 6

Fescue and Bahia grass seeds were adhered to a carrier substrate in accordance with the invention, using as an organic adhesive psilluim paste. The carrier was kept moist throughout germinations and root system formation in accordance with conventional practices. After four weeks, evaluation determined the grasses grew well attached to the carrier with the root systems established therebelow.

The foregoing substrate is also effective in limiting the soil transfer of nitrogen compounds from amassed manure sources. In the livestock industry, there has been increasing concern over an apparent transfer mechanism that cause a large amount of the nitrogen in various chemical forms to be driven from manures into the soil. Unpublished studies appear to show that beneath a typical chicken house, there is enough residual nitrogen for supporting corn and cotton crops for extended periods, upwards of 100 years. As soil constituents, these nitrates and nitrites are though to pose problems in the water supply with resulting illness potential in humans. Additionally, increased nitrogen loading poses additional pollution concerns in waterways. Initially, it was thought the problem was exasperated by high water tables or moisture levels in the litter of the broiler houses. Research to date has not confirmed the above as a causal factor.

In accordance with the invention, this transport mechanism is overcome by utilizing ionic chemicals to the substrate to reduce the ohmic resistance at prevailing litter moisture levels. Preferred additives include magnesium oxide, powdered magnesium suspension or other sacrificial anodic material in combination with electrolytes such as potassium hydroxide or sulfuric acid. In one beneficial system, the combination is applied as a surface layer on the sheet prior to comminuting. The material acts as a scavenger of nitrogen compounds.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of making a slurry comprising the steps of: making a mixture by weight of about 10% to 90% paper-based pulp and 10% to 90% cotton fiber having a fiber length of about 0.02 to about 10 mm, and 2% to 85% gypsum by dry weight of cotton fiber; adding water to said mixture to form a slurry having a solids content by weight of about 0.25% to 20%.

2. The method as recited in claim 1 including the step of processing said slurry to form a substrate.

3. The method as recited in claim 2 wherein said processing of said slurry is on paper making machinery to form said substrate.

4. The method as recited in claim 2 including the step of forming said substrate into discrete pieces.

5. The method as recited in claim 4 including the steps of comminuting said pulp, cutting said cotton fiber to a length of about 0.02 to 10 mm, and forming said gypsum to a consistent size.

6. The method as recited in claim 1 wherein said mixture comprises by weight 25 to 75 percent paper pulp and 25 to 75 percent cotton fiber, and 10 to 45 percent gypsum.

* * * * *